(12) United States Patent
Cloft et al.

(10) Patent No.: US 9,297,314 B2
(45) Date of Patent: Mar. 29, 2016

(54) GAS TURBINE ENGINE WITH ACCESSORY GEAR BOX

(71) Applicant: United Technologies Corporation, Hartford, CT (US)

(72) Inventors: Thomas G. Cloft, Glastonbury, CT (US); Robert L. Gukeisen, Middletown, CT (US); Claude Mercier, South Windsor, CT (US)

(73) Assignee: United Technologies Corporation, Hartford, CT (US)

( * ) Notice: Subject to any disclaimer, the term of this patent is extended or adjusted under 35 U.S.C. 154(b) by 572 days.

(21) Appl. No.: 13/719,303

(22) Filed: Dec. 19, 2012

(65) Prior Publication Data

US 2014/0165589 A1  Jun. 19, 2014

(51) Int. Cl.
| | |
|---|---|
| *F02C 7/32* | (2006.01) |
| *F02C 7/36* | (2006.01) |
| *F01D 25/28* | (2006.01) |
| *F01D 25/20* | (2006.01) |
| *F02C 7/268* | (2006.01) |
| *F02C 7/275* | (2006.01) |
| *F01D 25/24* | (2006.01) |
| *F02K 3/06* | (2006.01) |

(52) U.S. Cl.
CPC . *F02C 7/32* (2013.01); *F01D 25/28* (2013.01); *F02C 7/36* (2013.01); *F01D 25/20* (2013.01); *F01D 25/24* (2013.01); *F02C 7/268* (2013.01); *F02C 7/275* (2013.01); *F02K 3/06* (2013.01); *Y02T 50/671* (2013.01)

(58) Field of Classification Search
CPC .............. F02C 7/32; F02C 7/36; F02C 7/268; F02C 7/275; Y02T 50/671; B60K 25/00; B60K 25/02; B60K 25/022; F01D 25/24; F01D 25/28
USPC ....................................... 60/802, 788; 244/54
See application file for complete search history.

(56) References Cited

U.S. PATENT DOCUMENTS

| | | | | |
|---|---|---|---|---|
| 2,978,869 | A * | 4/1961 | Hiscock .................... | F02C 7/32 60/791 |
| 3,830,058 | A * | 8/1974 | Ainsworth ................... | 60/226.1 |
| 5,687,561 | A * | 11/1997 | Newton ....................... | 60/226.1 |
| 5,694,765 | A * | 12/1997 | Hield et al. ................ | 60/39.163 |
| 7,055,330 | B2 | 6/2006 | Miller | |
| 7,386,983 | B2 | 6/2008 | Miller | |
| 7,543,439 | B2 * | 6/2009 | Butt et al. .................. | 60/39.183 |

(Continued)

OTHER PUBLICATIONS

International Search Report and Written Opinion for International Application No. PCT/US2013/075626 completed on Apr. 11, 2014.

(Continued)

*Primary Examiner* — Phutthiwat Wongwian
*Assistant Examiner* — Alain Chau
(74) *Attorney, Agent, or Firm* — Carlson, Gaskey & Olds, PC

(57) ABSTRACT

A nacelle for incorporation into a gas turbine engine has an inner wall defining a bypass duct, and an outer wall. At least one drive shaft extends through the inner wall. The at least one drive shaft is connected to a gas turbine engine receiving the nacelle. The at least one drive shaft is connected to drive at least two accessory gear boxes, with the at least two accessory gear boxes being received between the inner and outer walls of the nacelle. A gas turbine engine is also disclosed.

11 Claims, 3 Drawing Sheets

(56) References Cited

U.S. PATENT DOCUMENTS

| | | | |
|---|---|---|---|
| 2006/0248900 A1* | 11/2006 | Suciu et al. | 60/802 |
| 2007/0157597 A1 | 7/2007 | Sharp | |
| 2008/0148881 A1* | 6/2008 | Moniz | F02C 7/32 74/15.6 |
| 2009/0123274 A1* | 5/2009 | Chaudhry | 415/182.1 |
| 2009/0184197 A1* | 7/2009 | Cloft | B64D 27/26 244/54 |
| 2009/0188334 A1 | 7/2009 | Merry et al. | |
| 2009/0290976 A1* | 11/2009 | Suciu | F01D 25/18 415/122.1 |
| 2010/0200692 A1* | 8/2010 | Goi | F02C 7/32 244/58 |
| 2011/0296847 A1* | 12/2011 | Williams | B21D 53/50 60/796 |
| 2013/0098058 A1* | 4/2013 | Sheridan | 60/783 |

OTHER PUBLICATIONS

International Preliminary Report on Patentability for International Application No. PCT/US2013/075626 mailed Jul. 2, 2015.

* cited by examiner

GAS TURBINE ENGINE WITH ACCESSORY GEAR BOX

BACKGROUND OF THE INVENTION

This application relates to a gas turbine engine, wherein an accessory gear box is split into at least two portions driven by the main gas turbine engine, and positioned within a nacelle.

Gas turbine engines are known, and typically include a fan delivering air into a bypass duct, and into a core engine. Air in the core engine passes through a compressor which compresses the air and delivers it into a combustor section. The air is mixed with fuel and ignited. Products of this combustion pass downstream over turbine rotors.

The turbine rotors are driven to rotate, and drive the fan and compressor. In addition, power from the turbine rotors rotation is utilized to generate electricity, and to drive accessories to support the operation of the gas turbine engine.

As an example, pumps for supplying liquid to the gas turbine engine are driven as accessories.

Another accessory is a starter. The starter is typically provided with a fluid drive, which drives turbine rotors to rotate the starter, and the starter begins to rotate other accessories and the gas turbine engine thru a drive shaft. The same drive shaft operates to drive other accessories, all through a gear box.

One known location for the accessory gear box is between an inner and outer wall of the nacelle. Typically, a single gear box has been provided at one circumferential location in the nacelle. This has resulted in the radial thickness of the nacelle being relatively large.

Recently a gear reduction has been provided between a turbine that drives the fan and the fan rotor. One result of this gear reduction, is that the fan rotor can be made much larger, and the volume of bypass air can be greatly increased to increase propulsion. To increase the fan diameter, the inner diameter of a nacelle also increases. With such an increased inner diameter, it becomes desirable to limit the radial thickness of the nacelle.

SUMMARY OF THE INVENTION

In a featured embodiment of this invention, a nacelle for incorporation into a gas turbine engine has an inner wall defining a bypass duct, and an outer wall, at least one drive shaft extending through said inner wall, said at least one drive shaft to be connected to a gas turbine engine receiving the nacelle, said at least one drive shaft being connected to drive at least two accessory gear boxes, with said at least two accessory gear boxes being received between said inner and outer walls of said nacelle.

In another embodiment according to the previous embodiment, at least one of said gear boxes includes a starter for the gas turbine engine.

In another embodiment according to any of the previous embodiments, at least one of the at least two gear boxes drives a fuel pump and a lubricant pump to support the gas turbine engine.

In another embodiment according to any of the previous embodiments, the at least one drive shaft consists of one drive shaft driving both of the at least two accessory gear boxes.

In another embodiment according to any of the previous embodiments, the at least one drive shaft includes at least two drive shafts, with one of the at least two drive shafts being connected to each of the at least two accessory gear boxes.

In another embodiment according to any of the previous embodiments, at least two accessory gear boxes are received axially between an upstream end and a downstream end of the nacelle.

In another featured embodiment, a gas turbine engine has a fan, a compressor section, a combustor section, and a turbine section. The turbine section drives a shaft to in turn drive the fan and compressor. At least one accessory shaft is connected for rotation with the turbine section. A nacelle has an inner wall defining a bypass duct receiving bypass air from the fan, and an outer wall. The at least one drive shaft extends through the inner wall and is connected to drive at least two accessory gear boxes. At least two accessory gear boxes are received between the inner and outer walls of the nacelle.

In another embodiment according to the previous embodiment, at least one of the gear boxes includes a starter for the gas turbine engine.

In another embodiment according to any of the previous embodiments, at least one of the at least two gear boxes drives a fuel pump and a lubricant pump to support the gas turbine engine.

In another embodiment according to any of the previous embodiments, at least one drive shaft consists of one drive shaft driving both of the at least two accessory gear boxes.

In another embodiment according to any of the previous embodiments, at least one drive shaft includes at least two drive shafts, with one of the at least two drive shafts connected to each of the at least two accessory gear boxes.

In another embodiment according to any of the previous embodiments, at least two accessory gear boxes are received axially between an upstream end and a downstream end of the nacelle.

In another embodiment according to any of the previous embodiments, the engine can be divided into two halves. A mount bracket mounts the engine to an aircraft in one of the halves. The at least two accessory gear boxes are in an opposed half.

In another featured embodiment, a gas turbine engine has a fan, a compressor section, a combustor section, and a turbine section. The turbine section drives a shaft to in turn drive the fan and compressor. At least one accessory shaft is connected for rotation with the turbine section. A nacelle has an inner wall defining a bypass duct receiving bypass air from the fan, and an outer wall. The at least one drive shaft extends through the inner wall, and is connected to drive at least two accessory gear boxes. The at least two accessory gear boxes are received between the inner and outer walls of the nacelle. At least one of the gear boxes includes a starter for the gas turbine engine. At least another of the said at least two gear boxes drives a fuel pump and a lubricant pump to support the gas turbine engine. At least two accessory gear boxes are received axially between an upstream end and a downstream end of the nacelle. The engine can be divided into two halves. A mount bracket mounts the engine to an aircraft in one of the halves. At least two accessory gear boxes are in an opposed half.

In another embodiment according to the previous embodiment, at least one drive shaft consists of one drive shaft driving both of the at least two accessory gear boxes.

In another embodiment according to any of the previous embodiments, at least one drive shaft includes at least two drive shafts, with one of the at least two drive shafts connected to each of the at least two accessory gear boxes.

These and other features of the invention may be best understood from the following specification and drawings, the following which is a brief description.

DETAILED DESCRIPTION

Figure 1:
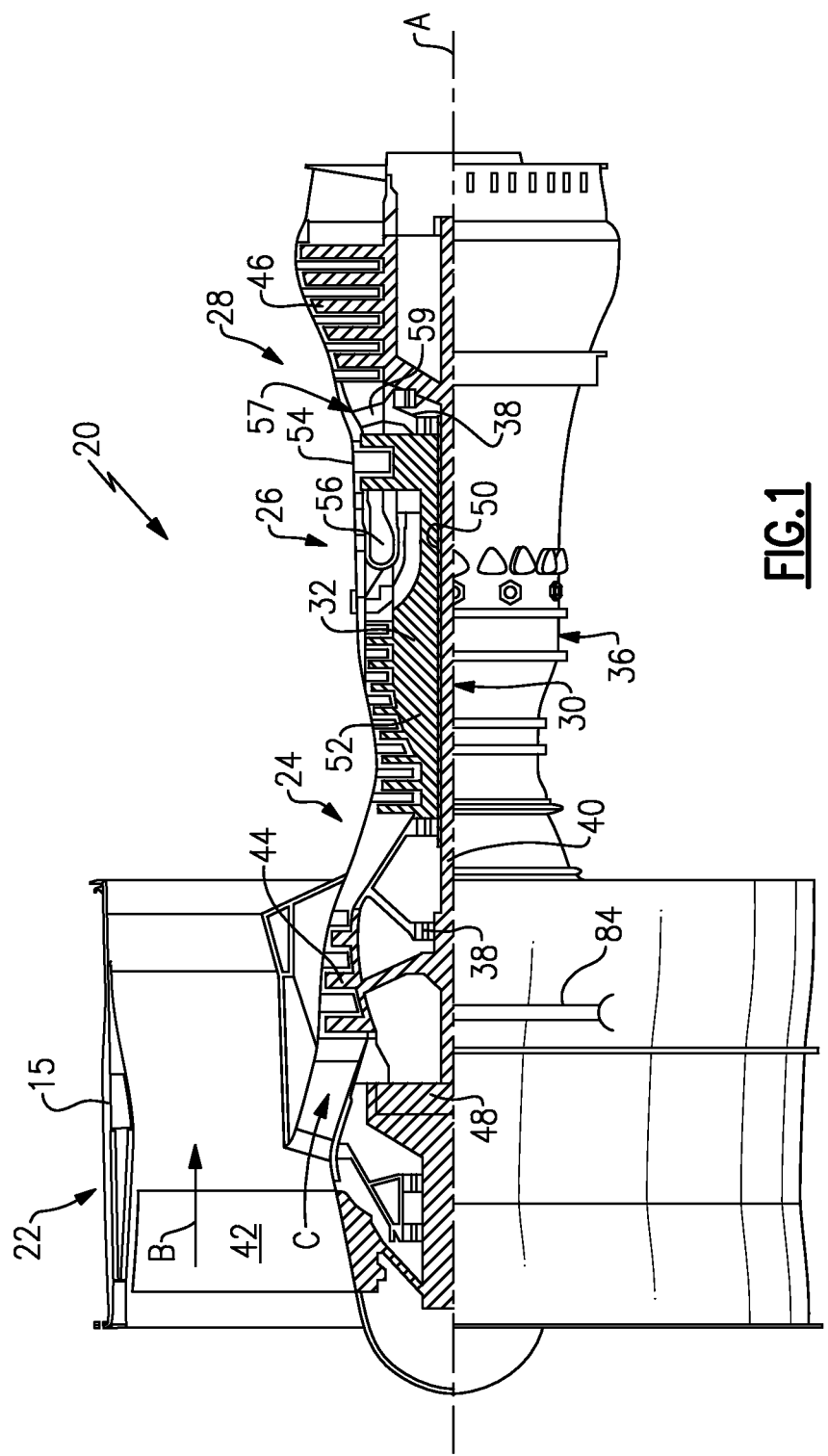
FIG. 1 schematically shows a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flowpath B in a bypass duct defined within a nacelle 15, while the compressor section 24 drives air along a core flowpath C for compression and communication into the combustor section 26 then expansion through the turbine section 28. Although depicted as a turbofan gas turbine engine in the disclosed non-limiting embodiment, it should be understood that the concepts described herein are not limited to use with turbofans as the teachings may be applied to other types of turbine engines including three-spool architectures.

The engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided.

The low speed spool 30 generally includes an inner shaft 40 that interconnects a fan 42, a low pressure compressor 44 and a low pressure turbine 46. The inner shaft 40 is connected to the fan 42 through a geared architecture 48 to drive the fan 42 at a lower speed than the low speed spool 30. The high speed spool 32 includes an outer shaft 50 that interconnects a high pressure compressor 52 and high pressure turbine 54. A combustor 56 is arranged between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path. The turbines 46, 54 rotationally drive the respective low speed spool 30 and high speed spool 32 in response to the expansion.

The engine 20 in one example is a high-bypass geared aircraft engine. In a further example, the engine 20 bypass ratio is greater than about six (6), with an example embodiment being greater than ten (10), the geared architecture 48 is an epicyclic gear train, such as a planetary gear system or other gear system, with a gear reduction ratio of greater than about 2.3 and the low pressure turbine 46 has a pressure ratio that is greater than about 5. In one disclosed embodiment, the engine 20 bypass ratio is greater than about ten (10:1), the fan diameter is significantly larger than that of the low pressure compressor 44, and the low pressure turbine 46 has a pressure ratio that is greater than about 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.5:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft, with the engine at its best fuel consumption—also known as "bucket cruise Thrust Specific Fuel Consumption ('TSFCT')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °\ R)/(518.7°\ R)]^{0.5}$. The "Low corrected fan tip speed" as disclosed herein according to one non-limiting embodiment is less than about 1150 ft/second.

A drive shaft 84 is shown schematically, and is operable to be driven by one of the turbine sections 54 or 46, and to in turn drive the turbine sections when driven by a starter. Typically, the drive shaft 84 communicates with a gear box which may be mounted within the nacelle.

Figure 2:
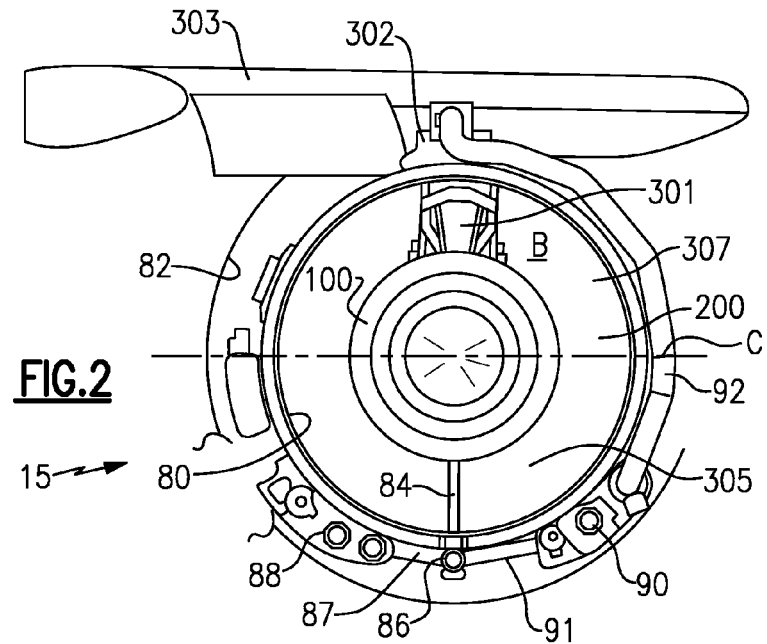
FIG. 2 shows a first embodiment.

FIG. 2 shows the nacelle 15 having an outer wall 82 and inner wall 80. The bypass duct 200 is defined inwardly of the inner wall 80. As shown, a take-off or drive shaft 84 is driven by the turbine in the core engine 100. This may operate as described above with regard to FIG. 1. The take-off shaft 84 extends through inner wall 80 and to a splitter gear box 86 such that it drives accessories in a first gear box 88. The gear box 88 takes in rotation from a split shaft 87, and drives several accessories. As an example, fuel pumps, oil pumps, etc. for enabling operation of the gas turbine engine may be driven by the gear box 88. A second gear box 90 is shown driven by a second split shaft 91. The gear boxes 88 and 90 are shown to be circumferentially spaced. Gear box 90 may incorporate other accessories for supporting operation of the gas turbine engine, and in particular may include a starter for the gas turbine engine. A supply of air is shown to the starter through a duct 92.

By splitting the gear box into two sub gear boxes 88 and 90, the radial thickness between the inner 80 and outer 82 walls may be smaller.

Figure 3:
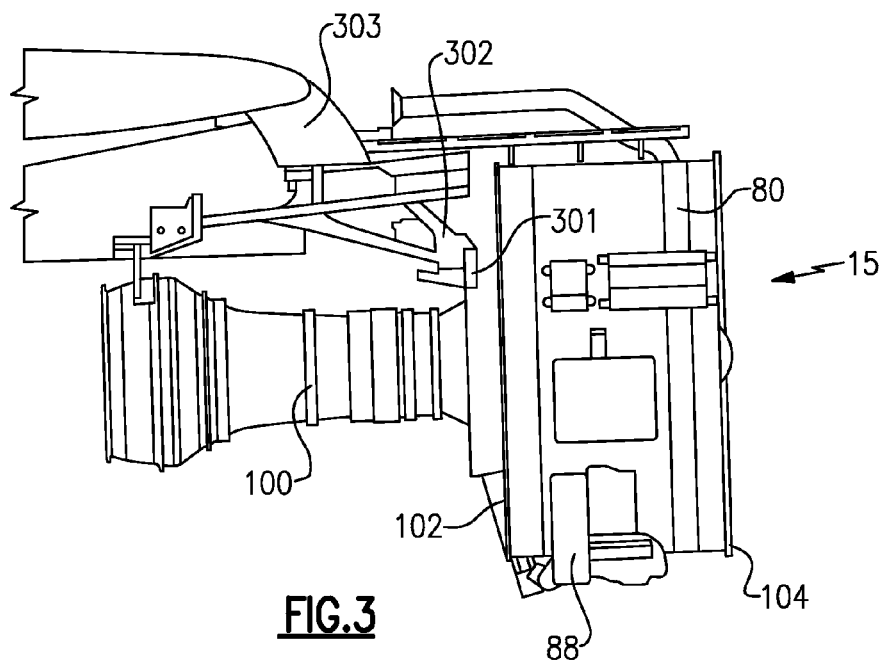
FIG. 3 is a side view of the first embodiment.

As can be appreciated from FIG. 3, both gear boxes 88 and 90 sit within an axial length between an upstream end 104 of the nacelle 15 and a downstream end 102.

Figure 4:
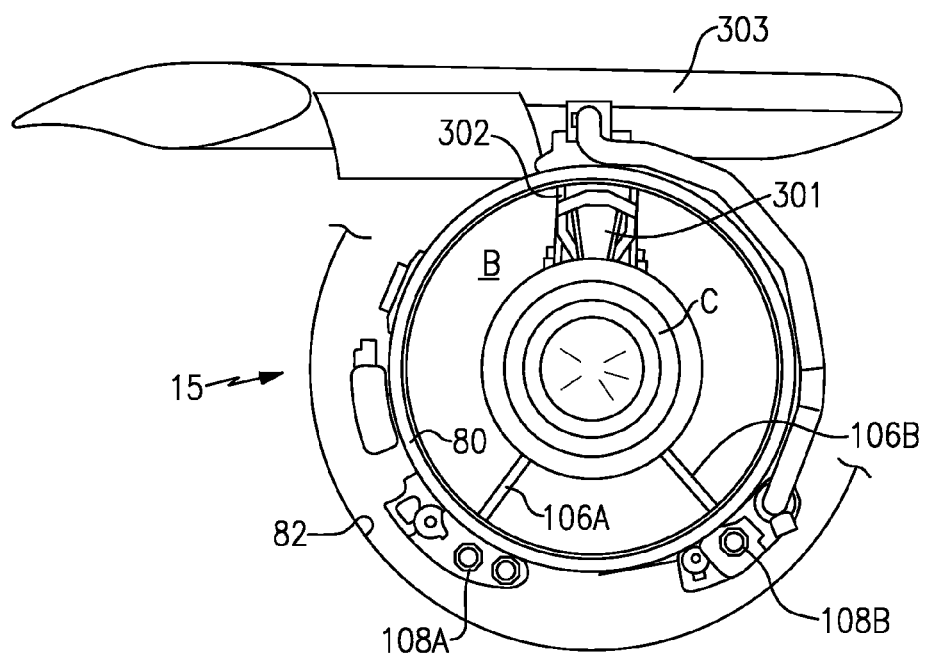
FIG. 4 is a front view of a second embodiment.

FIG. 4 shows a second embodiment wherein the single take-off shaft 84 is replaced by a pair of shafts 106A and 106B extending through the inner wall 80. Shaft 106A drives an accessory gear box 108A, while shaft 106B drives an accessory gear box 108B. Accessory gear box 108B may include a starter, and accessory gear box 108A may include several pumps, as mentioned with regard to the first embodiment.

The FIG. 4 embodiment would be received within the same axial envelope as that shown in FIG. 3.

Both of the embodiments would thus allow the outer wall 82 of the nacelle to be radially inward from what would typically be the case if the prior art single accessory gear box were received between walls 80 and 82.

As can be appreciated from FIGS. 2, 3, and 4, the two accessory gear boxes are mounted in what will be a vertically lower portion of the nacelle 15 once it is mounted on an aircraft.

As can be appreciated, there is a mount bracket 301 which is associated with the engine, and which is mounted to a pylon 302/303, which is typically part of the aircraft. As shown in FIG. 2, a horizontal center line C separates the engine into a vertically upper half 307 and a vertically lower half 305. The accessory gear boxes 88/90 or 108A/108B are both in the half 305, which will be vertically lower when the gas turbine engine is mounted on an aircraft. However, it can also be said that a center line can divide the engine into two halves, with the mount bracket 301 mounted in one of the halves, and the accessory gear boxes 88/90 or 108A/108B are in a different half Although embodiments of this invention have been disclosed, a worker of ordinary skill in this art would recognize that certain modifications would come within the scope of this invention. For that reason, the following claims should be studied to determine the true scope and content of this invention.

The invention claimed is:

1. A nacelle for incorporation into a gas turbine engine, comprising:
   a nacelle having an inner wall defining a bypass duct, and an outer wall, at least one drive shaft extending through said inner wall, said at least one drive shaft to be connected to a gas turbine engine receiving the nacelle, said at least one drive shaft being connected to drive at least two accessory gear boxes, with said at least two accessory gear boxes being received between said inner and outer walls of said nacelle; and
   said at least two accessory gearboxes being circumferentially spaced; and
   said at least one drive shaft consists of one drive shaft driving both of said at least two accessory gearboxes via a first split shaft and a second split shaft within the nacelle.

2. The nacelle as set forth in claim 1, wherein at least one of said gear boxes includes a starter for the gas turbine engine.

3. The nacelle as set forth in claim 1, wherein at least one of said at least two gear boxes drives a fuel pump and a lubricant pump to support the gas turbine engine.

4. The nacelle as set forth in claim 1, wherein said at least two accessory gear boxes are received axially between an upstream end and a downstream end of said nacelle.

5. A gas turbine engine comprising:
   a fan, a compressor section, a combustor section, and a turbine section, said turbine section for driving a shaft to in turn drive said fan and said compressor, at least one accessory shaft to be connected for rotation with said turbine section;
   a nacelle having an inner wall defining a bypass duct receiving bypass air from said fan, and an outer wall, said at least one drive shaft extending through said inner wall, and being connected to drive at least two accessory gear boxes, with said at least two accessory gear boxes being received between said inner and outer walls of said nacelle; and
   said engine can be divided into two halves, and a mount bracket for mounting said engine to an aircraft is in one of the halves, and said at least two accessory gear boxes are in an opposed half; and
   said at least one drive shaft consists of one drive shaft driving both of said at least two accessory gearboxes via a first slit shaft and a second slit shaft within the nacelle.

6. The engine as set forth in claim 5, wherein at least one of said gear boxes includes a starter for the gas turbine engine.

7. The engine as set forth in claim 5, wherein at least one of said at least two gear boxes drives a fuel pump and a lubricant pump to support the gas turbine engine.

8. The engine as set forth in claim 5, wherein said at least two accessory gear boxes are received axially between an upstream end and a downstream end of said nacelle.

9. The engine as set forth in claim 5, wherein said at least two accessory gear boxes are circumferentially spaced.

10. A gas turbine engine comprising:
    a fan, a compressor section, a combustor section, and a turbine section, said turbine section for driving a shaft to in turn drive said fan and said compressor, at least one accessory shaft to be connected for rotation with said turbine section;
    a nacelle having an inner wall defining a bypass duct receiving bypass air from said fan, and an outer wall, said at least one drive shaft extending through said inner wall, and being connected to drive at least two accessory gear boxes, with said at least two accessory gear boxes being received between said inner and outer walls of said nacelle;
    at least one of said gear boxes includes a starter for the gas turbine engine;
    at least another of said at least two gear boxes drives a fuel pump and a lubricant pump to support the gas turbine engine;
    said at least two accessory gear boxes are received axially between an upstream end and a downstream end of said nacelle; and
    said engine can be divided into two halves, and a mount bracket for mounting said engine to an aircraft is in one of the halves, and said at least two accessory gear boxes are in an opposed half; and
    said at least one drive shaft consists of one drive shaft driving both of said at least two accessory gearboxes via a first split shaft and a second split shaft within the nacelle.

11. The engine as set forth in claim 10, wherein said at least two accessory gear boxes are circumferentially spaced.

* * * * *

UNITED STATES PATENT AND TRADEMARK OFFICE
CERTIFICATE OF CORRECTION

| | | |
|---|---|---|
| PATENT NO. | : 9,297,314 B2 | Page 1 of 1 |
| APPLICATION NO. | : 13/719303 | |
| DATED | : March 29, 2016 | |
| INVENTOR(S) | : Thomas G. Cloft | |

It is certified that error appears in the above-identified patent and that said Letters Patent is hereby corrected as shown below:

IN THE CLAIMS:

In claim 5, column 6, line 10; where you find "slit" replace with --split--

Signed and Sealed this
Second Day of August, 2016

Michelle K. Lee
*Director of the United States Patent and Trademark Office*